(12) United States Patent
Yi (10) Patent No.: US 6,986,724 B2
(45) Date of Patent: Jan. 17, 2006

(54) HYDRAULIC CONTROL SYSTEM OF A SIX-SPEED AUTOMATIC TRANSMISSION FOR A VEHICLE

(75) Inventor: Jae Shin Yi, Suwon (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 10/747,916

(22) Filed: Dec. 29, 2003

(65) Prior Publication Data

US 2004/0248685 A1    Dec. 9, 2004

(30) Foreign Application Priority Data

Jun. 9, 2003    (KR) .................... 10-2003-0036873

(51) Int. Cl.
*F16H 31/00*    (2006.01)

(52) U.S. Cl. ..................................................... 475/119

(58) Field of Classification Search ................ 475/119, 475/133; 477/906
See application file for complete search history.

(56) References Cited

U.S. PATENT DOCUMENTS

| | | | | |
|---|---|---|---|---|
| 5,658,220 A | * | 8/1997 | Jang | ........................... 477/130 |
| 5,984,818 A | * | 11/1999 | Ryu | ........................... 475/132 |
| 6,394,926 B1 | * | 5/2002 | Jang | ........................... 475/116 |

* cited by examiner

*Primary Examiner*—Dirk Wright
(74) *Attorney, Agent, or Firm*—Morgan Lewis & Bockius LLP (57) ABSTRACT

The six-speed automatic transmission includes five frictional elements and is efficiently controlled by a minimal number of spool valves and solenoid valves. Drivability is, thereby enhanced and weight and cost are reduced.

8 Claims, 5 Drawing Sheets

| Shift-speed \ Frictional element | C1 | C2 | C3 | B1 | B2 |
|---|---|---|---|---|---|
| 1 | ○ | | | ○ | |
| 2 | ○ | | | | ○ |
| 3 | ○ | ○ | | | |
| 4 | ○ | | ○ | | |
| 5 | | ○ | ○ | | |
| 6 | | | ○ | | ○ |
| R | | ○ | | ○ | |

HYDRAULIC CONTROL SYSTEM OF A SIX-SPEED AUTOMATIC TRANSMISSION FOR A VEHICLE

CROSS-REFERENCE TO RELATED APPLICATIONS

This application claims priority of Korean Application No. 10-2003-0036873, filed Jun. 9, 2003, the disclosure of which is incorporated fully herein by reference.

FIELD OF THE INVENTION

Generally, the present invention relates to a hydraulic control system of a six-speed automatic transmission for a vehicle. More particularly, the present invention relates to hydraulic control system of a six-speed automatic transmission for a vehicle that can achieve six forward speeds and one reverse speed by controlling five frictional elements, five duty control solenoid valves, and one on/off solenoid valve.

BACKGROUND OF THE INVENTION

Typical automatic transmissions include a torque converter and a powertrain of a multiple speed gear mechanism connected to the torque converter. In addition, a hydraulic control system is typically provided at an automatic transmission for selectively operating at least one operational element included in the powertrain according to a running state of a vehicle.

A variety of such powertrains and hydraulic control systems have been developed by vehicle manufacturers according to their own schemes. Currently, four-speed automatic transmissions are most often found on the market, but a five-speed automatic transmission is also realized for enhancement of performance of power transmission and for enhanced fuel mileage of a vehicle.

Recently, proceeding from such a five-speed automatic transmission, six-speed automatic transmissions are being researched, such that power transmission performance of an automatic transmission is further enhanced. A six-speed automatic transmission usually includes an additional planetary gearset compared to a conventional five-speed automatic transmission.

Prior art hydraulic control systems of a six-speed automatic transmission for a vehicle use multiple solenoid valves, pressure control valves, and spool valves. This significantly increases the weight and cost of an automatic transmission.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a hydraulic control system of a six-speed automatic transmission for a vehicle having non-limiting advantages of applicability to a six-speed automatic transmission having five frictional elements. This achieves efficient shift control and drivability, as well as weight and cost reductions due to minimal usage of spool valves.

An exemplary hydraulic control system according to an embodiment of the present invention controls a six-speed automatic transmission for a vehicle, the automatic transmission including first, second, and third clutches, and first and second brakes.

An exemplary hydraulic control system of a six-speed automatic transmission for a vehicle according to an embodiment of the present invention includes: a line pressure control portion, a launch control portion, a pressure reduction control port, a shift control portion, and a fail safe control portion.

The line pressure control portion stably maintains hydraulic pressure supplied from an oil pump and varies a line pressure according to driving conditions. The launch control portion controls a torque increase of a torque converter and controls a damper clutch. The pressure reduction control portion reduces line pressure and outputs the reduced line pressure as control pressure. The shift control portion distributes a plurality of range pressures of a manual valve to the clutches and the brakes. The fail safe control portion controls hydraulic supply from the shift control portion to the clutches and the brakes.

The shift control portion includes first, second, third, and fourth pressure control valves respectively controlled by a reduced pressure of the reducing valve and controlled pressures of first, second, third, and fourth solenoid valves, for controlling at least one of the forward and reverse range pressures of the manual valve and thereby for supplying the controlled pressure to at least one frictional element.

In a further embodiment, the fail safe control portion includes a switch valve, a first fail safe valve, and a second fail safe valve. The switch valve is controlled by a control pressure of a solenoid valve and a plurality of control pressures selectively supplied from the manual valve, for selectively supplying hydraulic pressure received through an input port to a plurality of output ports.

The first fail safe valve is controlled by hydraulic pressure supplied from the second pressure control valve and the forward range pressure supplied from the manual valve, for selectively transmitting a hydraulic pressure from the third pressure control valve.

The second fail safe valve is controlled by line pressure and hydraulic pressures from the second pressure control valve and the first fail safe valve, for selectively transmitting a hydraulic pressure from the switch valve.

In a further embodiment, the manual valve includes: a line pressure line connected to the regulator valve; a reverse range pressure line for supplying a reverse range pressure in a reverse speed of the automatic transmission; and a forward range pressure line for supplying the forward range pressure in forward speeds of the automatic transmission.

In another further embodiment, the first pressure control valve is connected to the first clutch that is operated in forward first, second, third, and fourth speeds; the second pressure control valve is connected to the second clutch that is operated in forward third and fifth speeds, and is also connected to the first and second fail safe valves so as to supply control pressures thereto; the third pressure control valve is connected to the second brake that is operated in forward second and sixth speeds interposing the first fail safe valve, and is also connected to the second fail safe valve so as to supply control pressure thereto; and the fourth pressure control valve is connected to the third clutch that is operated in forward fourth, fifth, and sixth speeds interposing the switch valve, and is also connected to the first brake that is operated in forward first speed and a reverse speed interposing the switch valve and the second fail safe valve.

In another further embodiment, the first and third pressure control valves respectively control the forward range pressure of the manual valve; and the second and fourth pressure control valves respectively control the forward range pressure in forward speeds of the automatic transmission and the reverse range pressure in the reverse speed of the automatic transmission.

In another further embodiment, the switch valve is simultaneously connected, at its upstream side, to a forward range pressure line and a reverse range pressure line of the manual valve interposing a shuttle valve.

In another further embodiment, the switch valve includes a valve body and a valve spool disposed therein, wherein the valve body of the switch valve includes: a first port for selectively receiving the forward range pressure and the reverse range pressure as control pressure; a second port for receiving hydraulic pressure from the fourth pressure control valve; a third port for supplying the hydraulic pressure received through the second port to the third clutch; a fourth port for supplying the hydraulic pressure received through the second port to the second fail safe valve; and a fifth port for receiving a control pressure from the on/off solenoid valve, and the valve spool of the switch valve selectively communicates the second port to the third and fourth ports, under the control of control pressures received through the first and fifth ports.

In another further embodiment, the first fail safe valve includes a valve body and a valve spool disposed therein, wherein the valve body of the first fail safe valve includes: a first port for partially receiving a hydraulic pressure that is being supplied to the second clutch; a second port for receiving hydraulic pressure from the third pressure control valve; a third port for supplying the hydraulic pressure received through the second port to the second brake; and a fourth port for receiving the D range pressure as a control pressure, and the valve spool of the first fail safe valve selectively communicates the second port with the third port, under the control of control pressures received through the first and fourth ports.

In another further embodiment, the second fail safe valve includes a valve body and a valve spool disposed therein, wherein the valve body of the second fail safe valve includes: a first port for partially receiving a hydraulic pressure that is being supplied to the second clutch; a second port for partially receiving a hydraulic pressure that is being supplied to the second brake; a third port for receiving hydraulic pressure from the fourth pressure control valve; a fourth port for supplying the hydraulic pressure received through the third port to the first brake; and a fifth port for receiving the line pressure as a control pressure, and the valve spool of the second fail safe valve selectively communicates the third port with the fourth port, under the control of control pressures received through the first, second, and fifth ports.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
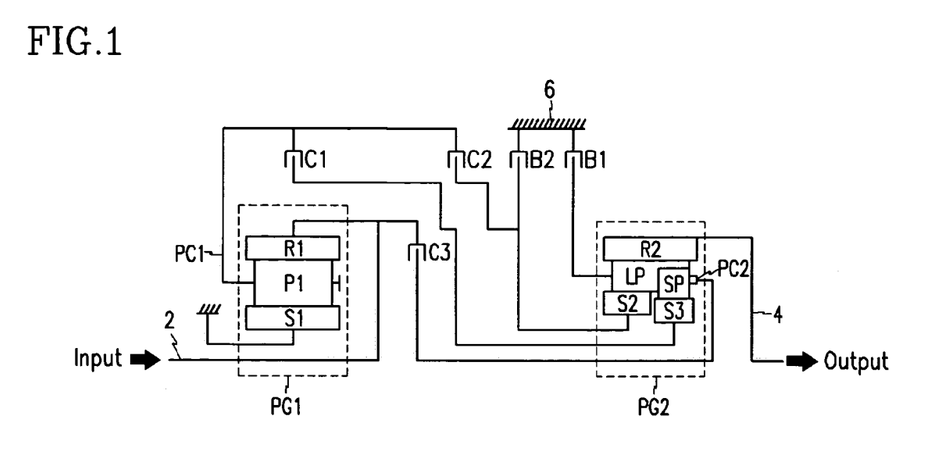
FIG. 1 is schematic diagram of an exemplary powertrain operable by a hydraulic control system, according to an embodiment of the present invention.

FIG. 1 is schematic diagram of an exemplary powertrain operable by a hydraulic control system according to an embodiment of the present invention.

The exemplary powertrain includes an input shaft 2 and an output shaft 4. The input shaft 2 is connected to an output shaft (not shown) of an engine through a torque converter (TC) (refer to FIG. 4), and the output shaft 4 is connected to a differential apparatus.

Between the input and output shafts 2 and 4, first and second planetary gearsets PG1 and PG2 are disposed. The first planetary gearset PG1 is a single pinion planetary gearset that includes a sun gear S1, a ring gear R1, and a pinion carrier PC1 that supports a pinion P1 engaged with the sun gear S1 and the ring gear R1.

The second planetary gearset PG2 is formed as a compound planetary gearset of a Lavingneaux type by combining a single pinion planetary gearset and a double pinion planetary gearset in which a ring gear R2 and a pinion carrier PC2 are commonly shared.

A ring gear of the first planetary gearset PG1 is hereinafter denoted as a first ring gear R1, a pinion carrier thereof as a first pinion carrier PC1, and a sun gear thereof as a first sun gear S1.

Regarding the second planetary gearset PG2, a sun gear thereof engaged with a long pinion LP is hereinafter denoted as a second sun gear S2, a sun gear thereof engaged with a short pinion SP as a third sun gear S3, a pinion carrier thereof holding the long and short pinions LP and Sp as a second pinion carrier PC2, and a ring gear thereof as a second ring gear R2.

Regarding the combination of the first and second planetary gearsets PG1 and PG2, the input shaft 2 is connected to the first ring gear R1 of the first planetary gearset PG1, and the output shaft 4 is connected to the ring gear R2 of the second planetary gearset PG2.

In addition, the first pinion carrier PC1 is connected to the third sun gear S3 interposing a first clutch C1, and is also connected to the second sun gear S2 interposing a second clutch C2.

The first sun gear S1 is fixedly connected to a transmission housing 6, and the input shaft 2 connected to the first ring gear R1 is connected to the second pinion carrier PC2 interposing a third clutch C3.

The second pinion carrier PC2 is variably connected to the transmission housing 6 interposing a first brake B1 such that it may selectively operate as a fixed element.

The second sun gear S2 engaged with the long pinion LP is variably connected to the transmission housing 6 interposing a second brake B2 such that it may selectively operate as a fixed element.

Figure 2:
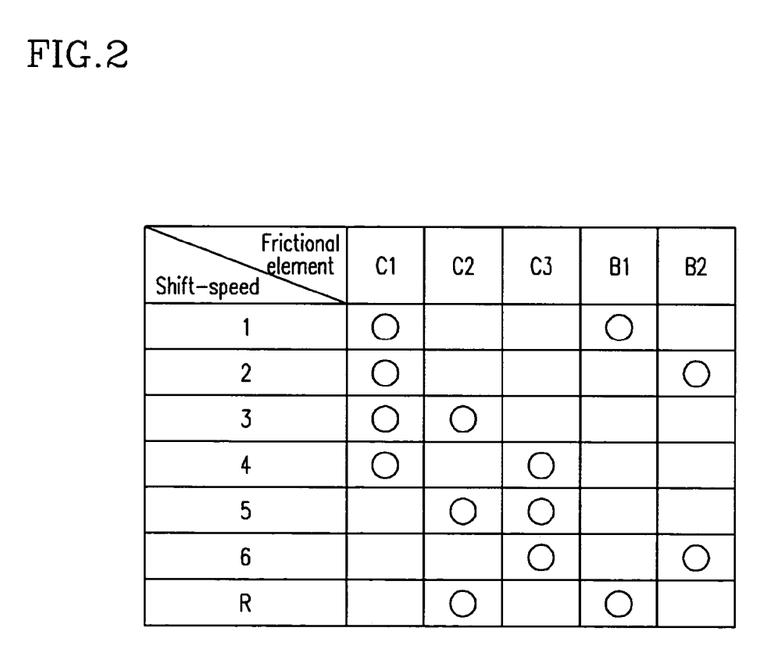
FIG. 2 is an operational chart for the powertrain of FIG. 1.

Such structured powertrain may achieve six forward speeds and one reverse speed by operating, as shown in an operational chart of FIG. 2, the first clutch C1 and the first brake B1 for a forward first speed, the first clutch C1 and the second brake B2 for a forward second speed, the first and second clutches C1 and C2 for a forward third speed, the first and third clutches C1 and C2 for a forward fourth speed, the second and third clutches C2 and C3 for a forward fifth speed, the third clutch C3 and the second brake B2 for a forward sixth speed, and the second clutch C2 and the first brake B1 for a reverse speed.

Figure 3:
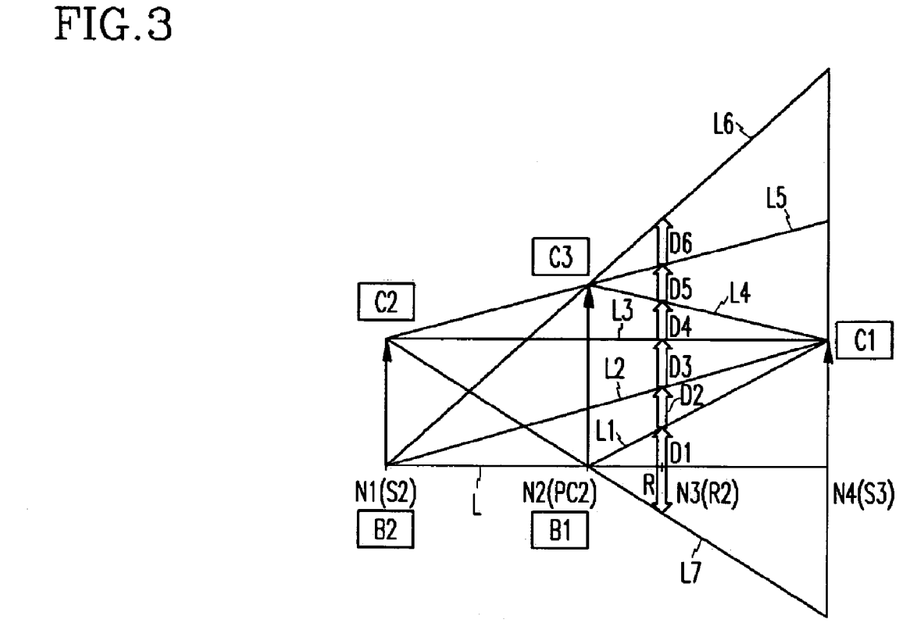
FIG. 3 is a speed diagram of a powertrain of FIG. 1 according to a lever analysis.

FIG. 3 is a speed diagram of a powertrain of FIG. 1 according to a lever analysis. According to the speed diagram, the second sun gear S2 is positioned at a first node N1, the second pinion carrier PC2 at a second node N2, the second ring gear R2 at a third node N3, and the third sun gear S3 at a fourth node N4.

The first, second, third, and fourth nodes N1, N2, N3, and N4 are expressed as operational elements of the second planetary gearset PG2 since the first planetary gearset PG1 outputs torque through only one operational element thereof, selectively to two operational elements of the second planetary gearset PG1, which is obvious to a person of ordinary skill in the art.

Since the first pinion carrier PC1 functions as an output element of the first planetary gearset PG1, the first planetary gearset PG1 reduces speed input from the input shaft 2 and outputs the reduced speed. An output speed of the first planetary gearset PG1 is selectively input to the second and third sun gears S2 and S3 of the second planetary gearset PG2.

A rotation speed input to the second pinion carrier PC2 from the input shaft 2 through the third clutch C3 is as was input from an engine. Therefore, a rotation speed received at the second pinion carrier PC2 during operation of the third clutch C3 is higher than a rotation speed that the second and third sun gears S2 and S3 respectively receive through the second and first clutches C2 and C1.

Shifting operation of a powertrain of FIG. 1 is hereinafter described in detail with reference with the speed diagram of FIG. 3.

At a forward first speed, the first clutch C1 and first brake B1 operate. Therefore, an output torque of the first planetary gearset PG1 is input to the fourth node N4 through the first clutch C1, and the second pinion carrier PC2 (i.e., second node N2) functions as a fixed element under the operation of the first brake B1.

Then the forward first speed is achieved because a first output speed D1 of the third node N3 (i.e., output element) is determined by a first speed line L1 connecting the fourth node N4 rotating as the input speed and the second node N2 that is fixed.

At a forward second speed, the first clutch C1 and the second brake B2 operate. In this case, the fixed element is changed to the first node N1 differently from at the first speed. Therefore, the first node N1 functions as the fixed element while a torque is input to the fourth node N4.

Then the forward second speed is achieved because a second output speed D2 of the third node N3 is determined by a second speed line L2 connecting the fourth node N4 rotating as the input speed and the first node N1 that is fixed.

At a forward third speed, the first clutch C1 and the second clutch C2 operate. In this case, the output torque of the first planetary gearset PG1 is simultaneously input to the second and third sun gears S2 and S3 of the second planetary gearset PG2. Therefore, the second planetary gearset PG2 integrally rotates.

Then the forward third speed is achieved because a third output speed D3 of the third node N3 is determined by a third speed line L3 connecting the fourth and first nodes N4 and N1 that are rotating as the input speed.

At a forward fourth speed, the second clutch C2 stops its operation and instead the third clutch C3 operates in comparison with the third speed. In this case, a higher rotation speed is transmitted through the third clutch C3 and through the first clutch C1.

Therefore, the forward fourth speed is achieved because a fourth output speed D4 of the third node N3 is determined by a fourth speed line L4 connecting the second node N2 of a high speed and the fourth node N4 of a low speed.

At a forward fifth speed, the first clutch C1 stops its operation and instead the second clutch C2 operates in comparison with the fourth speed. In this case, a higher rotation speed is transmitted through the third clutch C3 and through the second clutch C2.

Therefore, the forward fifth speed is achieved because a fifth output speed D5 of the third node N3 is determined by a fifth speed line L5 connecting the second node N2 of a high speed and the first node N1 of a low speed.

At a forward sixth speed, the second clutch C2 stops its operation and instead the second brake B2 operates in comparison with the fifth speed such that the first node becomes fixed.

Therefore, the forward sixth speed is achieved because a sixth output speed D6 of the third node N3 is determined by a sixth speed line L6 connecting the second node N2 of a high input speed and the first node N1 that is fixed.

At a reverse speed, the second clutch C2 and the first brake B1 operate. In this case, the first node N1 functions as an input element, and the second node N2 functions as a fixed element.

Therefore, the reverse speed is achieved because a reverse output speed R of the third node N3 is determined by a reverse speed line L7 connecting the first node N1 rotating as an input speed and the second node N2 that is fixed.

A hydraulic control system according to an embodiment of the present invention for operating such a powertrain is hereinafter described in detail.

Figure 4:
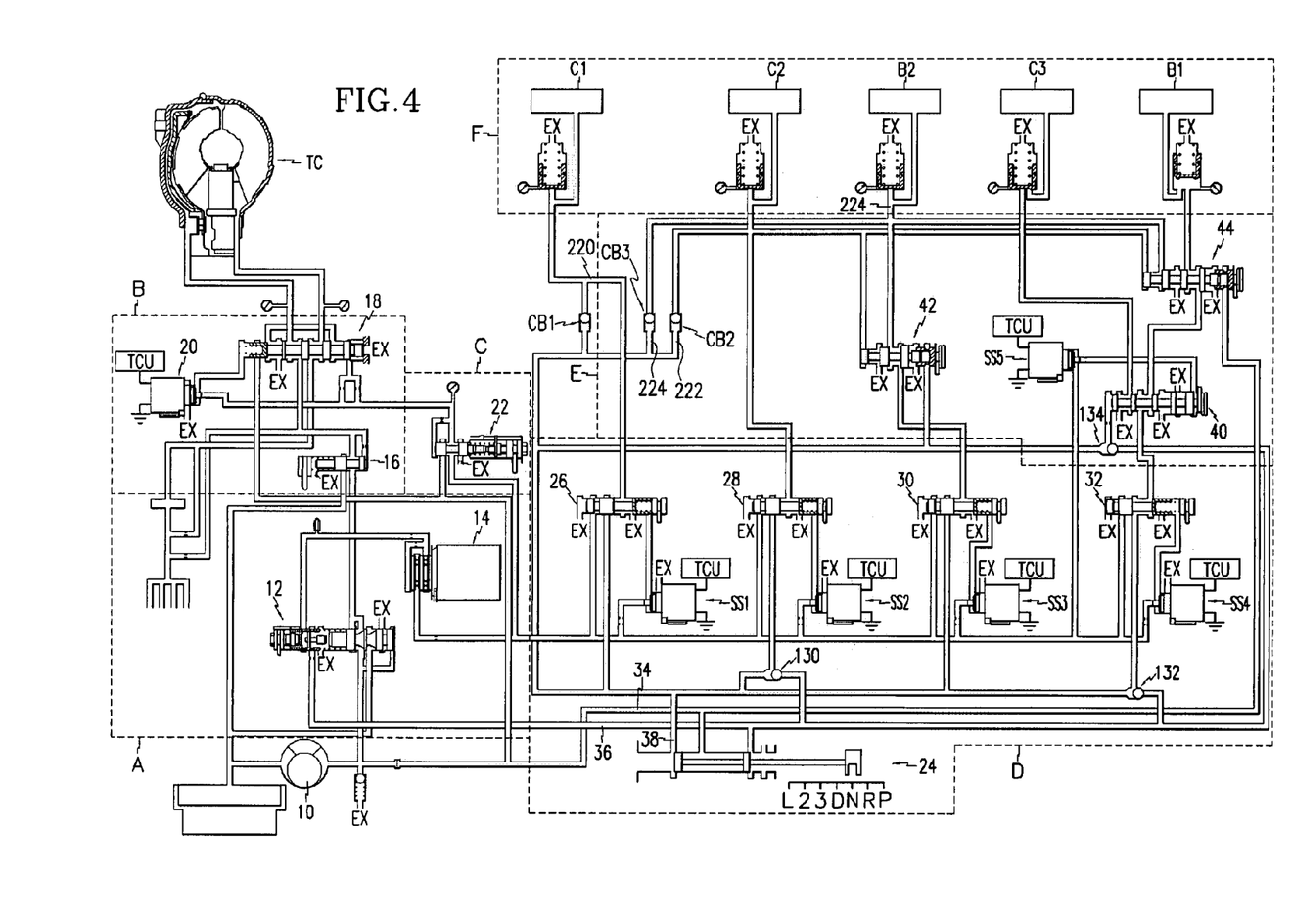
FIG. 4 is a schematic diagram of a hydraulic control system, according to an embodiment of the present invention.

As shown in FIG. 4, a hydraulic control system according to an embodiment of the present invention includes a line pressure control portion A, a launch control portion B, a pressure reduction control portion C, a shift control portion D, and a fail safe control portion E such that hydraulic pressure supply/release to each of the friction members C1, C2, C3, B1, and B2 is controlled.

The line pressure control portion A, the launch control portion B, and the pressure reduction control portion C are realized similarly to as known in the art.

The line pressure control portion A includes a regulator valve 12 and a linear control solenoid valve 14 for controlling the regulator valve 12. Therefore, the line pressure control portion A stably maintains hydraulic pressure supplied from the oil pump 10 at a predetermined level and varies a line pressure according to driving conditions, so an increase of fuel mileage is expected.

The launch control portion B includes a torque converter control valve 16 for reducing line pressure, a damper clutch control valve 18 for controlling engagement and disengagement of a damper clutch, and a duty control solenoid valve 20 for controlling the damper clutch control valve 18 according to an electrical signal from a transmission control unit (TCU). According to such an arrangement, a torque increase of a torque converter can be achieved for acceleration, and the damper clutch can be controlled to operate at a high vehicle speed.

The pressure reduction control portion C includes a reducing valve 22. The reducing valve 22 reduces hydraulic pressure supplied from the oil pump 10 and supplies the reduced hydraulic pressure to the solenoid valves 14 and 20 as their control pressures. At the same time, the reducing valve 22 supplies the reduced hydraulic pressure to the shift control portion D as a control pressure, which is described later.

The shift control portion D includes a manual valve 24 for changing hydraulic lines according to a manual operation. In addition thereto, the shift control portion D includes first, second, third, and fourth pressure control valves 26, 28, 30, and 32 that are respectively controlled by control pressures of first, second, third, and fourth solenoid valves SS1, SS2, SS3, and SS4 in addition to a control pressure supplied from the pressure reduction control portion C.

As shown in FIG. 4, the manual valve 24 selectively supplies hydraulic pressure received from a line pressure line 34, which is connected to the regulator valve 12, to a reverse range pressure line 36 and a forward range pressure line 38 according to a range shift thereof.

The reverse range pressure line 36 is connected to the regulator valve 12 such that hydraulic pressure in the line 36 can be controlled in an R range. In addition, the reverse range pressure line 36 is also connected to the second and fourth pressure control valves 28 and 32 and a switch valve 40 of the fail safe control portion E such that the reverse range pressure may be supplied thereto.

The forward range pressure line 38 is connected to the first, second, third, and fourth pressure control valve 26, 28, 30, and 32 of the shift control portion D and is also connected to the switch valve 40 and the first and second fail safe valves 42 and 44 of the fail safe control portion E, such that operating pressure may be supplied thereto.

The first pressure control valve 26 and the first solenoid valve SS1 of the shift control portion D is hereinafter described in detail with reference to FIG. 5.

Figure 5:
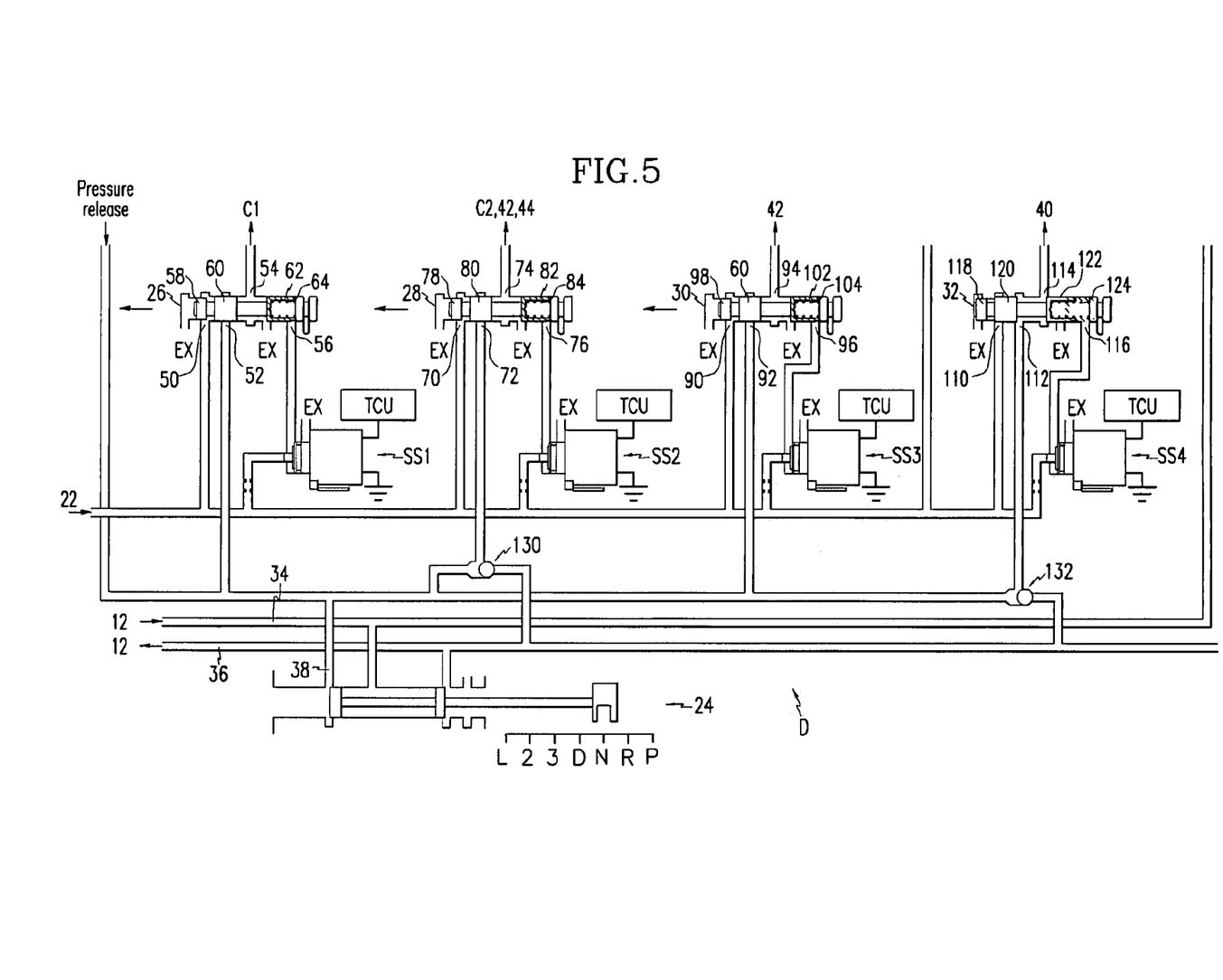
FIG. 5 is an enlarged view of a hydraulic pressure control portion of a hydraulic control system, according to an embodiment of the present invention.

FIG. 5 is an enlarged view of a hydraulic pressure control portion of a hydraulic control system according to an embodiment of the present invention.

The first pressure control valve 26 includes a valve body and a valve spool disposed therein. The valve body of the first pressure control valve 26 includes a first port (i.e., control pressure input port) 50 for receiving the reduced pressure from the reducing valve 22, a second port (i.e., operating pressure input port) 52 for receiving a hydraulic pressure from the manual valve 24, a third port (i.e., operating pressure output port) 54 for supplying the hydraulic pressure received at the second port 52 to first clutch C1, and a fourth port (i.e., control pressure input port) 56 for receiving a control pressure from the first solenoid valve SS1.

The first solenoid valve SS1 receives the reduced pressure from the reducing valve 22, and controls and supplies it to the fourth port 56. The valve spool of the first pressure control valve 26 includes a first land 58 having a small diameter and for receiving a control pressure supplied through the first port 50, a second land 60 for receiving the control pressure supplied through the first port 50 and for selectively opening the second port 52, and a third land 62 for receiving a control pressure supplied through the fourth port 56 and for selectively communicating the second and third ports 52 and 54 cooperatively with the second land 60.

Between the third land 62 and the valve body, an elastic member 64 is disposed such that the valve spool is always biased to the left in the drawing.

The first solenoid valve SS1 for controlling the first pressure control valve 26 is realized as a three way valve. When turned on, the first solenoid valve SS1 stops supplying the reduced pressure to the first pressure control valve 26, and exhausts hydraulic pressure supplied to the first pressure control valve 26 as control pressure. When turned off, the first solenoid valve SS1 closes an exhaust port and supplies the reduced pressure to the first pressure control valve 26.

Therefore, when the first solenoid valve SS1 is turned on, the valve spool of the first pressure control valve 26 moves to the right in the drawing, and accordingly the second port 52 becomes closed.

To the contrary, when the first solenoid valve SS1 is turned off, a control pressure is supplied to the fourth port 56 and thereby the valve spool moves to the left in the drawing such that the second port 52 communicates with the third port 54 and a hydraulic pressure is supplied to the first clutch C1.

The second, third, and fourth pressure control valves 28, 30, and 32 are structured the same as the first pressure control valve 26, except for variations regarding a pressure supply route from the manual valve 24 in forward speeds.

That is, the second, third, and fourth pressure control valves 28, 30, and 32 respectively include their valve bodies and valve spools disposed therein.

The second, third, and fourth pressure control valves 28, 30, and 32 receive the reduced pressure of the regulator valve 12 through their first ports (i.e., control pressure input port) 70, 90, and 110.

They receive hydraulic pressures from the manual valve 24 through their second ports (operating pressure input ports) 72, 92, and 112.

Through their third ports (operating pressure output ports) 74, 94, and 114, they supply hydraulic pressures received through their second ports 72, 92, and 112 to frictional elements or spool valves at their downstream side.

Through their fourth ports (control pressure input ports) 76, 96, and 116, they receive control pressures from the second, third, and fourth solenoid valves SS2, SS3, and SS4.

The valve spools of the second, third, and fourth pressure control valves 28, 30, and 32 respectively include first lands 78, 98, and 118 having small diameters and for receiving control pressures supplied through their first ports 70, 90, and 110; second lands 80, 100, and 120 for receiving the control pressures supplied through their first ports 70, 90, and 110 and for selectively opening their second ports 72, 92, and 112; and third lands 82, 102, and 122 for receiving control pressures supplied through their fourth ports 76, 96, and 116 and for selectively communicating their second ports 72, 92, and 112 with their third ports 74, 94, and 114 cooperatively with their second lands 80, 100, and 120.

Between the third lands 82, 102, and 122 and the valve body, elastic members 84, 104, and 124 are respectively disposed such that the valve spools are always biased to the left in the drawing.

The second, third, and fourth solenoid valves SS2, SS3, and SS4 are respectively realized as three-way valves. When turned on, they stop supplying the reduced pressure to the second, third, and fourth pressure control valves 28, 30, and 32, and exhaust hydraulic pressures supplied thereto as control pressures. When turned off, they close their exhaust ports and supply the reduced pressure to the second, third, and fourth pressure control valves 28, 30, and 32.

The above-described first, second, third, and fourth solenoid valves SS1, SS2, SS3, and SS4 can be obviously realized by a person of ordinary skill in the art.

Both the second ports 72 and 112 of the second and fourth pressure control valves 28 and 32 are simultaneously connected to the forward range pressure line 38 and the reverse range pressure line 36 of the manual valve 24, respectively interposing first and second shuttle valves 130 and 132.

Therefore, the second and fourth pressure control valves 28 and 32 selectively receive a forward range pressure (D range pressure) and a reverse range pressure (R range pressure).

Figure 6:
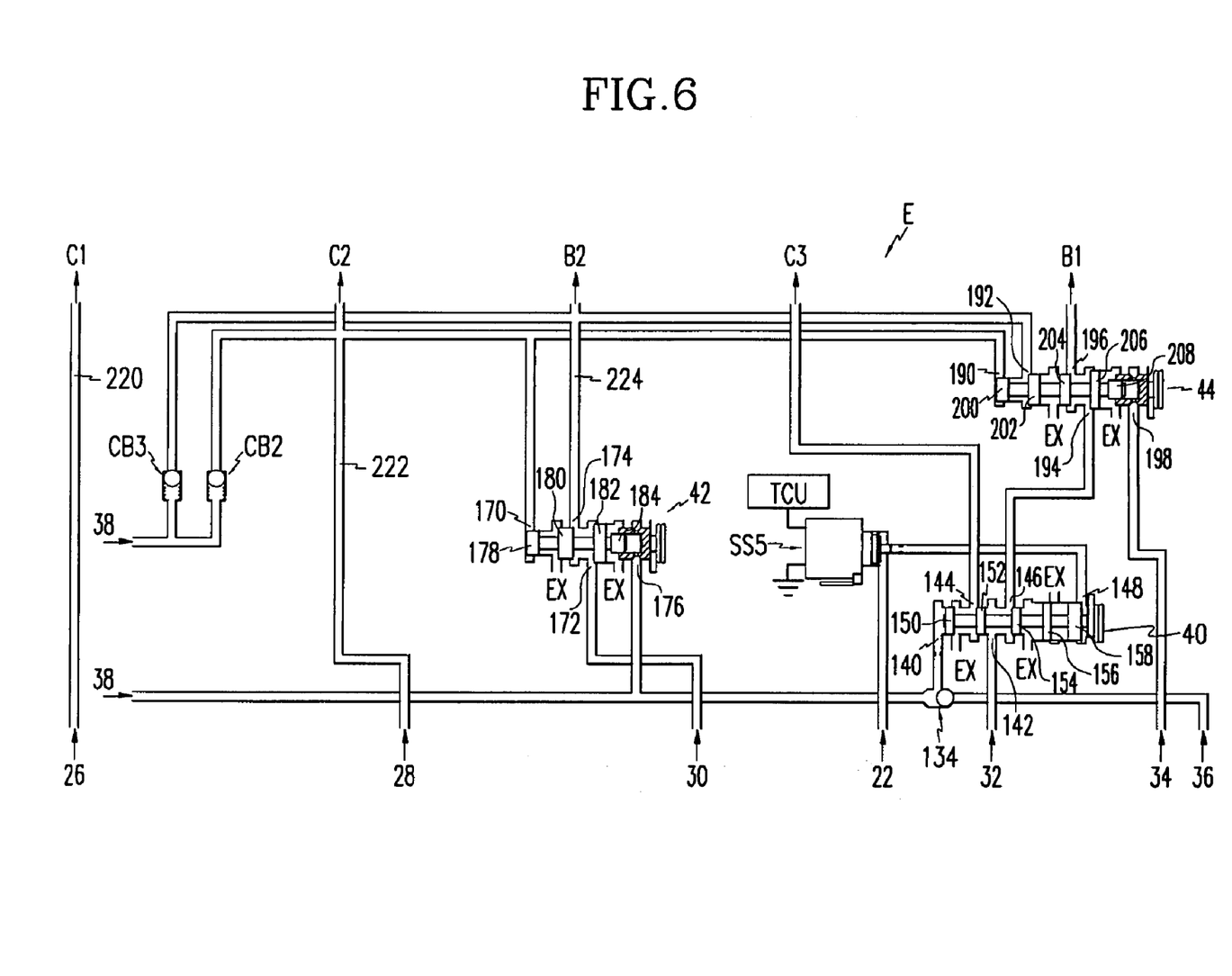
FIG. 6 is an enlarged view of a fail safe control portion of a hydraulic control system, according to an embodiment of the present invention.

The fail safe control portion E of a hydraulic control system according to an embodiment of the present invention is hereinafter described in detail with reference to FIG. 6.

The switch valve 40 includes a valve body and a valve spool disposed therein.

The valve body of the switch valve 40 includes a first port (i.e., control pressure input port) 140 simultaneously connected to the forward range pressure line 38 and the reverse range pressure line 36 of the manual valve 24 and interposing a third shuttle valve 134 such that it may selectively receive the forward range pressure or the reverse range pressure, a second port (i.e., operating pressure input port) 142 for receiving hydraulic pressure from the fourth pressure control valve 32, a third port (i.e., operating pressure output port) 144 for supplying the hydraulic pressure received through the second port 142 to the third clutch C3, a fourth port (i.e., operating pressure output port) 146 for supplying the hydraulic pressure received through the second port 142 to the second fail safe valve 44, and a fifth port (i.e., control pressure input port) 148 for receiving a control pressure from the on/off solenoid valve SS5.

The valve spool of the switch valve 40 includes a first land 150 for receiving a control pressure supplied through the first port 140, a second land 152 for selectively communicating the second port 142 with the third port 144, a third land 154 for selectively communicating the second port 142 with the fourth port 146, a fourth land 156 for selectively exhausting the hydraulic pressure output through the fourth port 146 cooperatively with the third land 154, and a fifth land 158 for receiving a control pressure supplied through the fifth port 148.

When the on/off solenoid valve SS5 is turned on, the valve spool moves to the right in the drawing by a hydraulic pressure supplied through the first port 140 such that the second port 142 communicates with the fourth port 146, because the first port 140 receives a control pressure while the fifth port 148 does not.

When the on/off solenoid valve SS5 is turned off, the second port 142 communicates with the third port 144, because the valve spool moves to the left in the drawing by a control pressure supplied through the fifth port 148 from the on/off solenoid valve SS5.

The first fail safe valve 42 is controlled by hydraulic pressure being supplied to the second clutch C2 and the forward range pressure, and selectively supplies a hydraulic pressure from the third pressure control valve 30 to the second brake B2.

The first fail safe valve 42 includes a valve body and a valve spool disposed therein.

The valve body of the first fail safe valve 42 includes a first port (i.e., control pressure input port) 170 for partially receiving a hydraulic pressure that is being supplied to the second clutch C2, a second port (i.e., operating pressure input port) 172 for receiving hydraulic pressure from the third pressure control valve 30, a third port (i.e., operating pressure output port) 174 for supplying the hydraulic pressure received through the second port 172 to the second brake B2, and a fourth port (i.e., control pressure input port) 176 for receiving the D range pressure as a control pressure.

The valve spool of the first fail safe valve 42 includes a first land 178 for receiving a control pressure supplied through the first port 170, a second land 180 for selectively communicating the second port 172 with the third port 174, a third land 182 for selectively communicating the second port 172 with the third port 174 cooperatively with the second land 180, and a fourth land 184 for receiving a control pressure supplied through the fourth port 148.

The second fail safe valve 44 is controlled by the line pressure and hydraulic pressures being supplied to the second clutch C2 and the second brake B2, and selectively supplies a hydraulic pressure from the fourth pressure control valve 32 to the first brake B1.

The second fail safe valve 44 includes a valve body and a valve spool disposed therein.

The valve body of the second fail safe valve 44 includes a first port (i.e., control pressure input port) 190 for partially receiving a hydraulic pressure that is being supplied to the second clutch C2, a second port (i.e., control pressure input port) 192 for partially receiving a hydraulic pressure that is being supplied to the second brake B2, a third port (i.e., operating pressure input port) 194 for receiving hydraulic pressure from the fourth pressure control valve 32, a fourth port (i.e., operating pressure output port) 196 for supplying the hydraulic pressure received through the third port 194 to the first brake B1, and a fifth port (i.e., control pressure input port) 198 for receiving the line pressure as a control pressure.

The valve spool of the second fail safe valve 44 includes a first land 200 for receiving a control pressure supplied through the first port 190, a second land 202 for receiving a control pressure supplied through the second port 192, a third land 204 for selectively communicating the third port 194 with the fourth port 196, a fourth land 206 for selectively communicating the third port 194 with the fourth port 196 cooperatively with the third land 204, and a fifth land 208 for receiving a control pressure supplied through the fifth port 198.

Lines 220, 222, and 224 for supplying hydraulic pressure to the first and second clutches C1 and C2 and the second brake B2 are respectively connected to the D range pressure line 38, respectively interposing first, second, and third check valves CB1, CB2, and CB3. The first, second, and third check valves CB1, CB2, and CB3 are disposed in a direction by which supplying of the D range pressure to the frictional elements C1, C2, and B2 is prevented.

According to such a fail safe control portion E, the forward third speed may be fixedly realized when a failure of the automatic transmission occurs while a vehicle is running. In addition, in a reverse speed, hydraulic pressure may be controlled to be safely supplied only to frictional elements (i.e., C2 and B1) for the reverse speed.

Flows of hydraulic pressures in each speed according to such a hydraulic control system are described hereinafter.

The hydraulic control system changes hydraulic pressure supply routes according to a predetermined operation schedule of the solenoid valves SS1–SS5, and thereby enables operation of frictional elements as shown in FIG. 2. Such a schedule may be charted as in the following Table 1.

TABLE 1

| Shift-speed | SS1 | SS2 | SS3 | SS4 | SS5 |
|---|---|---|---|---|---|
| First speed (D1) | OFF | ON | ON | OFF | ON |
| Second speed (D2) | OFF | ON | OFF | ON | OFF |
| Third speed (D3) | OFF | OFF | ON | ON | OFF |
| Fourth speed (D4) | OFF | ON | ON | OFF | OFF |
| Fifth speed (D5) | ON | OFF | ON | OFF | OFF |
| Sixth speed (D6) | ON | ON | OFF | OFF | OFF |
| Reverse speed (R) | ON | OFF | DUTY | OFF | OFF |

In a forward first speed, the first and fourth solenoid valves SS1 and SS4 are turned off, and the second and third solenoid valves SS2 and SS3 are turned on. Therefore, the first and fourth pressure control valves 26 and 32 have their valve spools move to the left in the drawing, and thereby transmit hydraulic pressure received from the manual valve 24 to a downstream side.

The hydraulic pressure that has passed through the first pressure control valve 26 is directly supplied to the first clutch C1.

The hydraulic pressure that has passed the fourth pressure control valve 32 is supplied to the second port 142 of the switch valve 40. The valve spool of the switch valve 40 is moved to the right in the drawing since the on/off solenoid valve SS5 is turned on. Therefore, hydraulic pressure arriving at the second port 142 of the switch valve 40 is transmitted to the second fail safe valve 44 through the fourth port 146.

At the second fail safe valve 44, its valve spool is moved to the left in the drawing by the line pressure such that the third and fourth ports 194 and 196 communicate. Accordingly, hydraulic pressure passes through the third and fourth ports 194 and 196 and is supplied to the first brake B1.

Accordingly, the first clutch C1 and the first brake B1 are operated and the forward first speed is achieved.

When the vehicle speed increases in the above first speed, the TCU turns on the fourth solenoid valve SS4, and turns off the third solenoid valve SS3 and the on/off solenoid valve SS5.

By turning on the fourth solenoid valve SS4, the hydraulic pressure once supplied to the first brake B1 is exhausted, and accordingly, the first brake B1 is released.

By turning off the third solenoid valve SS3, the third pressure control valve 30 transmits hydraulic pressure arriving at the second port 92 to the first fail safe valve 42.

In this case, at the first fail safe valve 42, its valve spool is moved to the left in the drawing by the control pressure of the forward range pressure such that the second and third ports 172 and 174 communicate. Accordingly, hydraulic pressure arriving at the first fail safe valve 42 is supplied to the second brake B2, and thereby the second brake 2 is engaged.

In this way, shifting to the forward second speed is achieved.

When the vehicle speed increases in the above second speed, the TCU turns on the third solenoid valve SS3, and turns off the second solenoid valve SS2.

By turning on the third solenoid valve SS3, the hydraulic pressure once supplied to the second brake B2 is exhausted, and accordingly, the second brake B2 is released.

By turning off the second solenoid valve SS2, the valve spool of the second pressure control valve 28 moves to the left in the drawing.

Therefore, hydraulic pressure arriving at the second port 72 of the second pressure control valve 28 is supplied to the second clutch C2, and accordingly the second clutch C2 is engaged.

In this way, shifting to the forward third speed is achieved.

When the vehicle speed increases in the third speed, the TCU turns on the second solenoid valve SS2, and turns off the fourth solenoid valve SS4.

By turning on the second solenoid valve SS2, the hydraulic pressure once supplied to the second clutch C2 is exhausted, and accordingly, the second clutch C2 is released.

By turning off the fourth solenoid valve SS4, the valve spool of the fourth pressure control valve 32 moves to the left in the drawing.

Therefore, hydraulic pressure arriving at the second port 112 of the fourth pressure control valve 32 is supplied to the third clutch C3 via the switch valve 40, and accordingly the third clutch C3 is engaged.

Since the on/off solenoid valve SS5 is turned off, the valve spool of the switch valve 40 moves to the left in the drawing by a control pressure supplied through the fifth port 148. Therefore, the second port 142 communicates with the third port 144, and thereby the hydraulic pressure of the fourth pressure control valve 32 is transmitted to the third clutch C3.

In this way, shifting to the forward fourth speed is achieved.

When the vehicle speed increases in the above fourth speed, the TCU turns on the first solenoid valve SS1, and turns off the second solenoid valve SS2.

By turning on the first solenoid valve SS1, the hydraulic pressure once supplied to the first clutch C1 is exhausted, and accordingly, the first clutch C1 is released.

By turning off the second solenoid valve SS2, the valve spool of the second pressure control valve 28 moves to the left in the drawing.

Therefore, hydraulic pressure arriving at the second port 72 of the second pressure control valve 28 is supplied to the second clutch C2, and accordingly the second clutch C2 is engaged.

In this way, shifting to the forward fifth speed is achieved.

When the vehicle speed increases in the above fifth speed, the TCU turns on the second solenoid valve SS2, and turns off the third solenoid valve SS3.

By turning on the second solenoid valve SS2, the hydraulic pressure once supplied to the second clutch C2 is exhausted, and accordingly, the second clutch C2 is released.

By turning off the third solenoid valve SS3, the third pressure control valve 30 transmits hydraulic pressure arriving at the second port 92 to the first fail safe valve 42.

In this case, at the first fail safe valve 42, its valve spool is moved to the left in the drawing by the control pressure of the forward range pressure such that the second and third ports 172 and 174 communicate. Accordingly, hydraulic pressure arriving at the first fail safe valve 42 is supplied to the second brake B2, and thereby the second brake 2 is engaged.

In this way, shifting to the forward sixth speed is achieved.

In the reverse speed, the TCU turns on the first and third solenoid valves SS1 and SS3, and turns off the second and fourth solenoid valves SS2 and SS4 and the on/off solenoid valve SS5.

The reverse range pressure supplied from the reverse range pressure line 36 of the manual valve 24 is supplied to the second and fourth pressure control valves 28 and 32 via the first and second shuttle valves 130 and 132. Since the second and fourth solenoid valves SS2 and SS4 are turned off, hydraulic pressures arriving at the second and fourth pressure control valves 28 and 32 pass them, and are respectively supplied to the second clutch C2 and the switch valve 40.

At the switch valve 40, its valve spool is moved to the right in the drawing by a control pressure of the reverse range pressure such that the second and fourth ports 142 and 146 communicate. Accordingly, the hydraulic pressure arriving at the switch valve 40 is transmitted to the second fail safe valve 44.

At the second fail safe valve 44, its valve spool is moved to the left in the drawing by a control pressure of the line pressure such that the third and fourth ports 194 and 196 communicate. Accordingly, the hydraulic pressure arriving at the second fail safe valve 44 is transmitted to the first brake B1, and the first brake B1 becomes engaged.

According to the above process, the second clutch C2 and the first brake B1 become engaged, and thereby shifting to the reverse speed is achieved.

As described above, according to a hydraulic control system according to an embodiment of the present invention, a six-speed automatic transmission for a vehicle having five frictional elements is efficiently controlled with use of a minimal number of spool valves, and thereby drivability is enhanced, and weight and cost are reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system of a six-speed automatic transmission for a vehicle, the automatic transmission including first, second, and third clutches and first and second brakes, the hydraulic control system comprising:
a line pressure control portion stably maintaining hydraulic pressure supplied from an oil pump and varying a line pressure according to driving conditions;
a launch control portion for controlling a torque increase of a torque converter and for controlling a damper clutch;
a pressure reduction control portion for reducing line pressure and for outputting the reduced line pressure as control pressure;
a shift control portion for distributing a plurality of range pressures of a manual valve to the clutches and the brakes;
a fail safe control portion for controlling hydraulic supply from the shift control portion to the clutches and the brakes;
wherein the shift control portion comprises first, second, third, and fourth pressure control valves respectively controlled by a reduced pressure of a reducing valve and controlled pressures of first, second, third, and fourth solenoid valves, for controlling at least one of the forward and reverse range pressures of the manual valve and thereby for supplying the controlled pressure to at least one frictional element;
wherein the fail safe control portion includes:
a switch valve controlled by a control pressure of a solenoid valve and a plurality of control pressures selectively supplied from the manual valve, for selectively supplying hydraulic pressure received through an input port to a plurality of output ports;
a first fail safe valve controlled by hydraulic pressure supplied from the second pressure control valve and the forward range pressure supplied from the manual valve, for selectively transmitting a hydraulic pressure from the third pressure control valve; and
a second fail safe valve controlled by line pressure and hydraulic pressures from the second pressure control valve and the first fail safe valve, for selectively transmitting a hydraulic pressure from the switch valve.

2. The hydraulic control system of claim 1, wherein the manual valve comprises:
a line pressure line connected to a regulator valve;
a reverse range pressure line for supplying a reverse range pressure in a reverse speed of the automatic transmission; and
a forward range pressure line for supplying the forward range pressure in forward speeds of the automatic transmission.

3. The hydraulic control system of claim 1, wherein:
the first pressure control valve is connected to the first clutch that is operated in forward first, second, third, and fourth speeds;
the second pressure control valve is connected to the second clutch that is operated in forward third and fifth speeds, and is also connected to first and second fail safe valves so as to supply control pressures thereto;
the third pressure control valve is connected to the second brake that is operated in forward second and sixth speeds interposing the first fail safe valve, and is also connected to the second fail safe valve so as to supply control pressure thereto; and
the fourth pressure control valve is connected to the third clutch that is operated in forward fourth, fifth, and sixth speeds interposing the switch valve, and is also connected to the first brake that is operated in forward first speed and a reverse speed interposing the switch valve and the second fail safe valve.

4. The hydraulic control system of claim 1, wherein:
the first and third pressure control valves respectively control the forward range pressure of the manual valve; and
the second and fourth pressure control valves respectively control the forward range pressure in forward speeds of the automatic transmission and the reverse range pressure in the reverse speed of the automatic transmission.

5. The hydraulic control system of claim 1, wherein the switch valve is simultaneously connected, at its upstream side, to a forward range pressure line and a reverse range pressure line of the manual valve, interposing a shuttle valve.

6. The hydraulic control system of claim 1, wherein the switch valve comprises a valve body and a valve spool disposed therein,
wherein the valve body of the switch valve comprises:
a first port for selectively receiving the forward range pressure and the reverse range pressure as control pressure;
a second port for receiving hydraulic pressure from the fourth pressure control valve;
a third port for supplying the hydraulic pressure received through the second port to the third clutch;
a fourth port for supplying the hydraulic pressure received through the second port to the second fail safe valve;
a fifth port for receiving a control pressure from the on/off solenoid valve, and the valve spool of the switch valve selectively communicates the second port to the third and fourth ports, under the control of control pressures received through the first and fifth ports.

7. The hydraulic control system of claim 2, wherein the first fail safe valve comprises a valve body and a valve spool disposed therein,
wherein the valve body of the first fail safe valve comprises:
a first port for partially receiving a hydraulic pressure that is being supplied to the second clutch;
a second port for receiving hydraulic pressure from the third pressure control valve;
a third port for supplying the hydraulic pressure received through the second port to the second brake; and
a fourth port for receiving the D range pressure as a control pressure, and
the valve spool of first fail safe valve selectively communicates the second port with the third port, under the control of control pressures received through the first and fourth ports.

8. The hydraulic control system of claim 2, wherein the second fail safe valve comprises a valve body and a valve spool disposed therein,
wherein the valve body of the second fail safe valve comprises:
a first port for partially receiving a hydraulic pressure that is being supplied to the second clutch;
a second port for partially receiving a hydraulic pressure that is being supplied to the second brake;
a third port for receiving hydraulic pressure from the fourth pressure control valve;
a fourth port for supplying the hydraulic pressure received through the third port to the first brake; and
a fifth port for receiving the line pressure as a control pressure, and the valve spool of the second fail safe valve selectively communicates the third port with the fourth port, under the control of control pressures received through the first, second, and fifth ports.

* * * * *